(12) United States Patent
Holley et al.

(10) Patent No.: US 7,074,449 B1
(45) Date of Patent: *Jul. 11, 2006

(54) METHOD FOR TREATING AND PROCESSING LUPINE SEEDS CONTAINING ALKALOID, OIL AND PROTEIN

(75) Inventors: Wolfgang Holley, Bruckberg (DE); Klaus Müller, Freising (DE); Hisham Kamal, Attenkirchen (DE); Andreas Wäsche, Langenbach (DE); Axel Borcherding, München (DE); Thomas Luck, München (DE)

(73) Assignee: Fraunhofer Gesellschaft zur Förderung Derangewandten Forschung E.V., München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/936,696
(22) PCT Filed: Mar. 9, 2000
(86) PCT No.: PCT/EP00/02069

§ 371 (c)(1),
(2), (4) Date: Mar. 5, 2002

(87) PCT Pub. No.: WO00/54608

PCT Pub. Date: Sep. 21, 2000

(30) Foreign Application Priority Data

Mar. 17, 1999 (DE) .................................. 199 12 037
Mar. 18, 1999 (DE) .................................. 199 12 045

(51) Int. Cl.
*A23L 1/20* (2006.01)
*A23L 1/211* (2006.01)
*A23J 1/14* (2006.01)

(52) U.S. Cl. .................... 426/430; 426/431; 426/457; 426/634
(58) Field of Classification Search ................. 426/430, 426/431, 457, 634
See application file for complete search history.

(56) References Cited

U.S. PATENT DOCUMENTS 4,122,104 A * 10/1978 Witte ........................... 554/15
4,466,923 A * 8/1984 Friedrich ....................... 554/8
6,518,443 B1 * 2/2003 Beyer et al. ................. 554/201

FOREIGN PATENT DOCUMENTS

DE   3542075   *   6/1987
EP    441672   *   8/1991

OTHER PUBLICATIONS

Soybean Utilization. Published 1987. Authors: Snyder et al. pp. 82-85.*
Journal of the American Oil Chemists' Society. vol. 59. No. 5. Published May, 1982. Authors: Oritz etal. pp. 241-244.*

* cited by examiner

*Primary Examiner*—Anthony Weier
(74) *Attorney, Agent, or Firm*—Antonelli, Terry, Stout and Kraus, LLP.

(57) ABSTRACT

A method of treating and processing alkaloid, oil and protein-containing lupine seeds for the extraction of products from the lupine seeds by means of targeted fractionation is described, whereby the comminuted lupine seed is de-oiled by introducing a solvent and the residue is depleted of substances soluble in the acid range, preferably of alkaloids, by adding acids. The invention is characterized by the provisions that the lupine seeds are comminuted and/or shaped to form discoid flakes in such a way that after pre-crushing of the shelled or non-shelled seed containing the plant seeds the comminution of the plant seeds is carried out by means of a cooled flocculating roller, and the seed is heated by indirect supply of heat, largely with exclusion of water, and that after de-oiling the depletion of the flakes of substances soluble in the acid range, preferably of alkaloids, is performed by aqueous extraction, with a refined product of reduced alkaloid level and an aqueous extract being obtained.

50 Claims, 2 Drawing Sheets

METHOD FOR TREATING AND PROCESSING LUPINE SEEDS CONTAINING ALKALOID, OIL AND PROTEIN

BACKGROUND OF THE INVENTION

1. Field of the Invention

The invention relates to a method of treating and processing alkaloid-, oil- and protein-containing lupine seeds for the extraction of products from the lupine seeds by means of targeted fractionation, whereby the comminuted lupine seed is de-oiled by introducing a solvent and the residue is depleted of substances soluble in the acid range, preferably of alkaloids, by adding acids.

2. Description of Prior Art

Proteins or protein preparations, respectively, are considered to be raw materials for the food-processing and fodder industries and are used in manifold applications in industrial chemistry, for instance for the production of adhesives, emulsions of photographic layers or cosmetics, just to name some of them.

As proteins are an essential component in animals and plants they are renewable native raw materials suitable for extraction from milk, soybeans and wheat on an industrial scale, for instance. Lupine seeds, which are similar to soybeans in terms of their composition in view of protein level, crude fibre fraction and oil concentration, are particularly important. Lupine cultivation and the processing of lupine seeds for the extraction of desired protein products is therefore of particular interest because lupines can be grown also in regions unsuitable for soy beans, for example in Western Europe or Australia.

Due to plant-inherent bitter principles, the so-called alkaloids, a direct utilization of lupine products is limited, particularly for food applications, and in the case of so-called bitter lupines, which are expedient in terms of cultivation, it is even entirely precluded. When lupine seeds are processed it is therefore necessary to remove the alkaloids in order to obtain products for nutritional use. At the same time, the extracted alkaloids may be selectively employed as active ingredients in agriculture and in the pharmaceutical industry, which renders the complete utilization of lupines or bitter lupines, respectively, extremely interesting from an economic point of view as well.

The German Patent DE 537 265, published in 1931, disclosed, for instance, a method useful utilization of lupines with disembitterment by stepwise extraction with aqueous solutions. Disembitterment is carried out by stepwise extraction of chipped lupines in a moist state, with the addition of an acid and subsequent dissolution of the salts forming in the acid bath.

Moreover, WO 83/00419 discloses a method of and a device for extraction of the bitter ingredients from the seeds of bitter lupines after cold washing of the lupines, which are present in an extremely finely ground condition, with lupine extract solutions of different concentrations, on the counter-flow principle, with water being used as the solvent.

One improved method is disembittering lupine seeds is disclosed in the document WO 97/12524 that provides for an initial thermal treatment of the plant seeds, after comminution of the lupine seeds to grit-like grains having diameters between 200 and 600 µm, so as to achieve a selective deactivation of enzymes present in the plant seeds. The thermal treatment is performed directly by means of a blanching technique, that is by direct introduction of hot steam into the comminuted seeds. After the blanching step, the plant seeds are subjected to a two-stage process for disembitterment, wherein the first extraction step results in the extraction of the alkaloids as well as other anti-nutritive substances. To this end, the plant seeds are mixed with fresh potable water as a solvent in an acid medium in a counter-flow extraction operation. The mixing operation may be preferably carried out in several stages until an extract enriched with anti-nutritive substances and an extractable refined product are obtained, that is rich in proteins and roughage The refined product obtained from the first extraction step is added with water as a solvent in an alkaline medium in a second step. A refined product enriched with roughage as well as a protein milk enriched with proteins are obtained as results of the second extraction step.

All the aforedescribed disembitterment methods are based on a common objective, specifically the objective of extracting, on the one hand, proteins in the purest form possible and, on the other hand, of obtaining roughage for the food or fodder industries, which are disembittered as completely as possible.

The aforedescribed methods, however, present various inherent disadvantages, too: Firstly, plant seeds and lupine seeds in particular have an oil level of roughly 10 to 15%, including lipophilic secondary ingredients such as carotinoids, lecithins or lipophilic alkaloids, in addition to pure oil such as triglycerin.

Even though the known method according to WO 97/12524 proposes a deactivation of the enzymes present in the plant seeds, which precedes the disembitterment process, so that the situation may be precluded that an enzymatic oxidation of exiting unsaturated fatty acids will occur during storage of the disembittered products of this process, which could result in a rancid flavour, for instance, which were inexpedient for application in the food sector, the deactivation is carried out by means of blanching, which means that the plant seeds are exposed to hot steam, which, even though it deactivates the enzymes, on the one hand, creates, on the other hand, unavoidable damage to the storage of proteins as well so that they lose their native form and characteristics.

Finally, the shaping of the comminuted lupine seeds contributes to the success of the disembitterment process, too. The form of grit grains proposed in WO 97/12524 is thus inexpedient insofar as it encloses a comparatively large volume from which the individual components to be extracted must be removed, which means that as the spacing between the interior of the volume and the outside of each grit particle increases, the substances to be extracted are less easily extracted from the grit-shaped lupine seed fragments to be disembittered. On the other hand, WO 83/00419 proposes the grinding of the lupine seeds to be disembittered to produce an extremely fine meal with grain sizes between 1 µm and 50 µm; with this fine grinding of the lupine seeds to form a meal, however, problems occur in terms of process engineering in the separation of the liquid from the solid phase—even though the individual extraction paths inside a "dust grain" are kept very small. This requires complex filtering steps expensive in terms of process engineering, which involve a substantial cost and time factor in application on an industrial scale.

Another known disembitterment process is described in the laid-open German Patent Application DE-OS 29 08 320, wherein the lupine seeds are comminuted and de-oiled. The protein-containing residue produced in that process is subsequently heated and extracted with the addition of an acid. For this known method, too, the aforedescribed disadvantages such as the introduction of water for enzyme deactivation or insufficient comminution of the lupine seeds must be mentioned.

It is also possible to use any protein and oil or starch-containing seed, in addition to the aforementioned lupine seed, such as rape, linseed or leguminous plants, particularly soy-beans, peanuts, peas and horse beans.

SUMMARY OF THE INVENTION

The present invention is a method of treating and processing alkaloid, oil and protein-containing lupine seeds for the production of products from lupine seeds by way of targeted fractioning in such a way that the products—proteins in extremely pure form as well as roughage—can be freed of bitter principles as completely as possible, wherein the steps of operation to be carried out in succession should involve the smallest technological expenditure possible. On the one hand, particular attention must be paid to the aspect that the proteins to be treated should remain unchanged in their native form whilst enzymes present in the lupine seeds should be deactivated and lipophilic alkaloids, in particular, should be extracted as completely as possible in the most gentle manner. The method is intended to improve the degree of disembitterment of lupine seeds, that has so far been achieved, substantially by the simplest process steps possible, which are harmonized with each other, or to reduce, respectively, the engineering expenditure substantially with the same disembitterment result.

In accordance with the present invention, the following steps of operation are carried out in the method of treating and processing alkaloid, oil and protein-containing lupine seeds for the extraction of products from the lupine seeds that may be both rich in bitter principles—the so-called bitter lupines—or poor in bitter principles, by way of targeted fractioning:

First of all, the lupine seeds are shelled and the shells are isolated. Then the kernel meat of the seeds is comminuted or shaped, respectively, to produce discoid flakes, for example by passing them through a flocculating roller. The flocculating roller is cooled so that the comminution process becomes more efficient and gentler for the seeds to be comminuted. Cooling is particularly intended to prevent the seeds from heating during comminution. The cooling effect can be ensured, for example, with common tap water that maintains the comminuted seeds in a temperature range still below the denaturation temperature of the lupine proteins. Suitable temperatures are within the range between 8° C. and 35° C. Then heat is indirectly supplied into the flakes, with water being largely excluded. Such indirect heating is carried out in a heat pan into which the comminuted flakes are passed. Due to the gentle indirect supply of heat the enzymes contained in the lupine seeds are deactivated while the proteins remain largely in their original form and retain their functional properties in unmodified form because they do not come into direct contact with water, which would cause damage to the natural properties of the proteins.

Then the flakes are selectively subjected to a de-oiling process in which a solvent, preferably hexane, is sued that permits the extraction of the lipids contained in the discoid flakes. It is equally possible to use alternatively ethanol, industrial hexane, pentane, heptane, or supercritical $CO_2$ instead of hexane. Moreover, the de-oiling process with the aforementioned solvent may also be combined with a mechanical oil separation in the form of presses or with a de-oiling step using ethanol and water mixtures and applying centrifuging techniques.

The extracted lipids concern, in particular, also all the lipophilic alkaloids contained in the lupine seeds, which may be isolated by a de-oiling step so that merely lipophobic alkaloids are present as bitter principles in the hexane-wet discoid flakes which must then be extracted in a subsequent disembitterment process. The flakes de-oiled and de-solventised in the aforedescribed manner present preferably an oil concentration of less than 2%, preferably of less than 1%, of the dry solid. The solvent is preferably removed without water in an overheated solvent such as hexane. On principle, however, any other optional de-solventising method is applicable. The benzene is preferably extracted from the hexane-wet meal in a gentle manner, e.g. using supercritical hexane.

For disembitterment, the discoid flakes, from which benzene is removed and in which the lipid level is reduced, are subjected to an aqueous fractioning process. It is also possible to mix shell fractions to the flakes of a reduced lipid level, which had been reduced to a granularity of less than 5 mm in a preceding grinding step. The disembitterment process substantially comprises two stages.

Initially, the de-oiled flakes—possible together with shell fractions—are introduced into an aqueous acid medium in which all those substances dissolve which are contained in the flakes and which are soluble in the acid range. As a result, one obtains an aqueous acid extract containing the alkaloids in particular, as well as a disembittered refined product insoluble in the acid range, that consists substantially of the flake substance.

The flakes so extracted—which are also referred to as meal—may be subjected to a further subsequent extraction aiming at the production of isolated protein products or protein concentrates. The subsequent extraction involves aqueous systems, too, which may be provided in several stages in succession. The solid phase can be isolated from the liquid phase by means of decanting for obtaining the protein extract as well as products or compartments depleted of proteins, while it is possible to control the protein level remaining in the residual flaky substance by defined process conditions such as the pH level, the extraction times as well as temperatures.

It is furthermore possible to obtain a product from the aqueous acid extract, which can be produced by an isolation of fine particles by means of a separator. As the first step of the method is a multi-stage process in some kind of cascade including a plurality of aqueous acid process steps in succession the fine substance is isolated after the passage through the first process stage at the earliest. In one process stage, that serves to adjust a ratio of less than 10:1 between the refined products insoluble in the cid range and the aqueous extract, one part of the aqueous extract is added to the immediately joining process stage. It is also possible to set a ratio of more than 10:1 between the refined products insoluble in the acid range and the aqueous extract by outward transfer of one part of the aqueous extract.

The product that can be obtained in this step hence presents a level of dry solids of at least 12%, preferably higher than 16%, a protein level in the dry solids of more than 70%, preferably higher than 85%, and an alkaloid percentage of less than 0.5%, preferably 0.1% in the dry solids. Moreover, the product contains roughage that is fractioned by particle sizes into at least 2, preferably 3, fractions after or during the drying phase.

When the refined product insoluble in the acid range, which is obtained after the first process stage, is introduced into an aqueous alkaline medium in which all those substances are dissolved which dissolve in the alkaline range, that is at pH levels of more than 7.5, a refined product of reduced alkaloid level is obtained as final result immediately after the second process step, which is not only freed of any lipophilic alkaloids but also of alkaloids soluble in the acid range.

The refined product of reduced alkaloid level, which is also referred to as protein curds, is preferably dried and presents a protein dispersibility index of 60 to 90 and a water-absorption capacity of less than 2 g/g at a pH level of roughly 7 and a temperature of 20 to 30° C. after drying.

Moreover, the protein curds may be confectioned by hydrothermal treatment to form a water binding product, with application of a temperature higher than 65° C., preferably 85° C., for drying the protein curds and with a water percentage at the beginning of the drying step of less than 85%, preferably less than 75%, while the water absorption capacity of the water binding product to be obtained is higher than 4.0 g/g, preferably higher than 5 g/g.

The aforedescribed method is suitable for application not only in the treatment of lupine seeds but also for processing other protein and oil or starch-containing seeds such as rape, linseed or leguminous seeds, particularly soy beans, peanuts, peas and horse beans.

BRIEF DESCRIPTION OF THE DRAWINGS

The present invention will be described in the following by exemplary embodiment, without any limitation of the general inventive idea, with reference to the drawing wherein.

DESCRIPTION OF AN EMBODIMENT OF THE INVENTION

Figure 1:
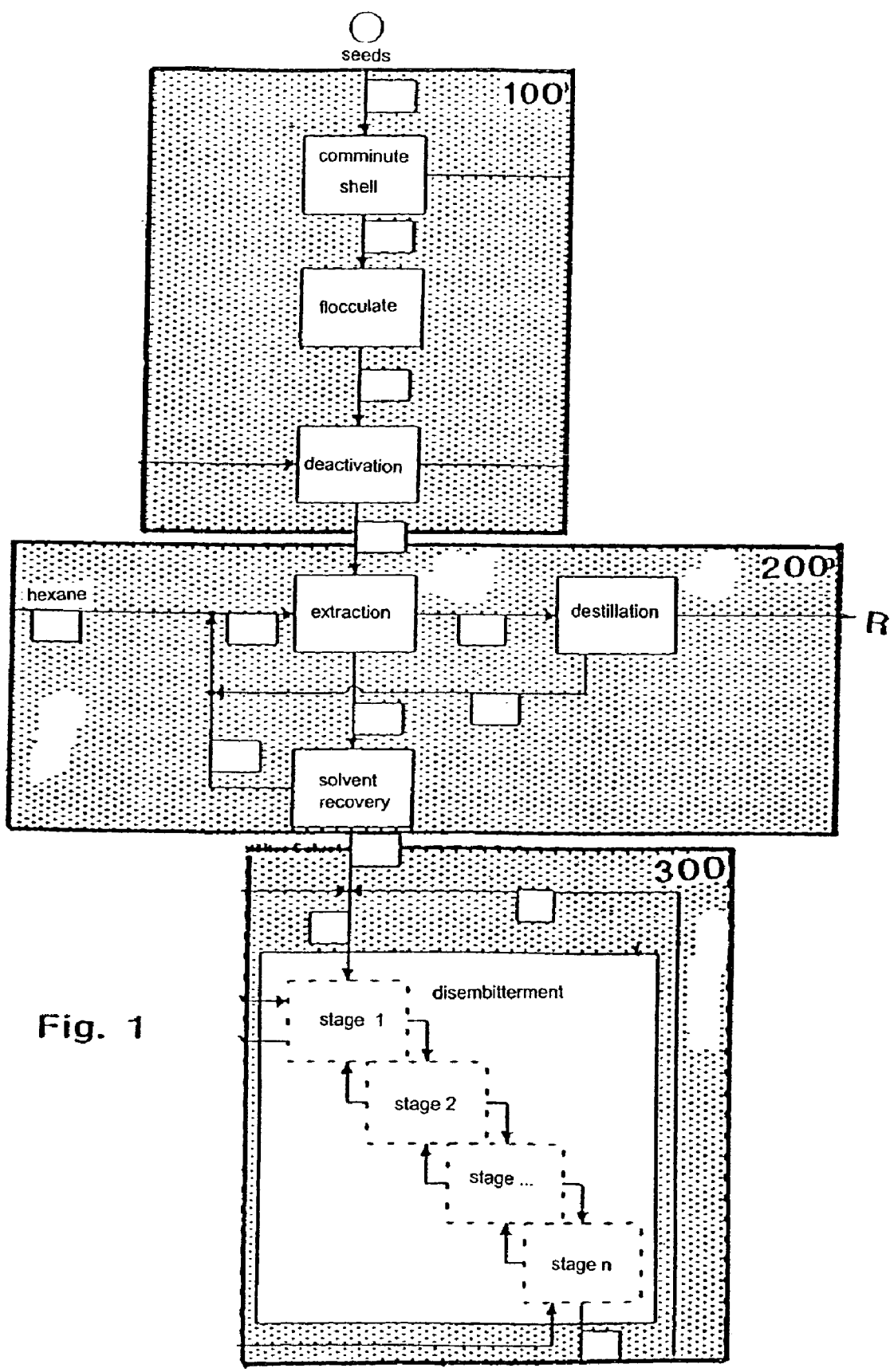
FIGS. 1, 2 show a schematic of the process for de-oiling and disembitterment of alkaloid-containing lupine seeds.

FIG. 1 illustrates a block schematic of the first three process steps. In the first process step 100 the lupine seeds are prepared, in the second process step 200 de-oiling takes place, and in the third process step 300 disembitterment is carried out.

The starting material for the method is lupine seed that is comminuted and shelled in a preparatory step. The lupine seeds isolated in this manner are then flocculated, preferably in the course of a rolling operation, which means that the lupine seeds are pressed to form seed fragments having a typical platelet thickness between 300 and 400 μm. The flocculating roller used for the rolling operation is cooled, not least in an approach to enhance the efficiency of the comminuting operation.

After comminution, the flakes arrive in a heat pan where they are subjected to indirect thermal treatment. Even though this thermal introduction of heat deactivates, on the one hand, the seed-inherent enzymes, the native properties of the proteins are maintained to the largest possible extent, so that later enzymatic fat oxidations, which would result in rancid flavors, may be precluded. The flocculated lupine seed, which has moreover been enzymatically deactivated, is now passed on to a subsequent de-oiling process 200 where the flakes are exposed to hexane as a solvent so that any lipophilic substances such as triglycerins and crude lecithins as well as lipophilic alkaloids in particular may be extracted. This is typically performed in a belt-type or rotary extractor. The liquid phase is subjected to distillation; in this step the used solvent, hexane, is firstly recovered and made available for re-utilization and secondly the extracted crude oil R can be purified in a further refining process that is not illustrated in the FIG. 1. The crude lecithins can be further refined by use of acetone.

The hexane-wet-de-oiled flakes present in de-oiling after the extraction process 200 are isolated from the solvent in the gentlest manner possible, which means that they are de-sol-ventised. In this step it is particularly essential that the solubility of the proteins is either retained are can be selectively varied as far as this is feasible from a technological point of view. To this end, the hexane-wet flakes are de-solventised, for example by application of an over heated solvent, under low-water conditions.

The de-oiled flake-shaped lupine seeds from this preliminary processing step are than freed of any alkaloids still present in the lupine seeds in a disembitterment step 300. The lupine seed disembitterment takes place in a multi-stage aqueous disembitterment process in a manner known per se, in which the alkaloids may be extracted continuously, quasi continuously or in batches, as is illustrated in FIG. 1.

Figure 2:
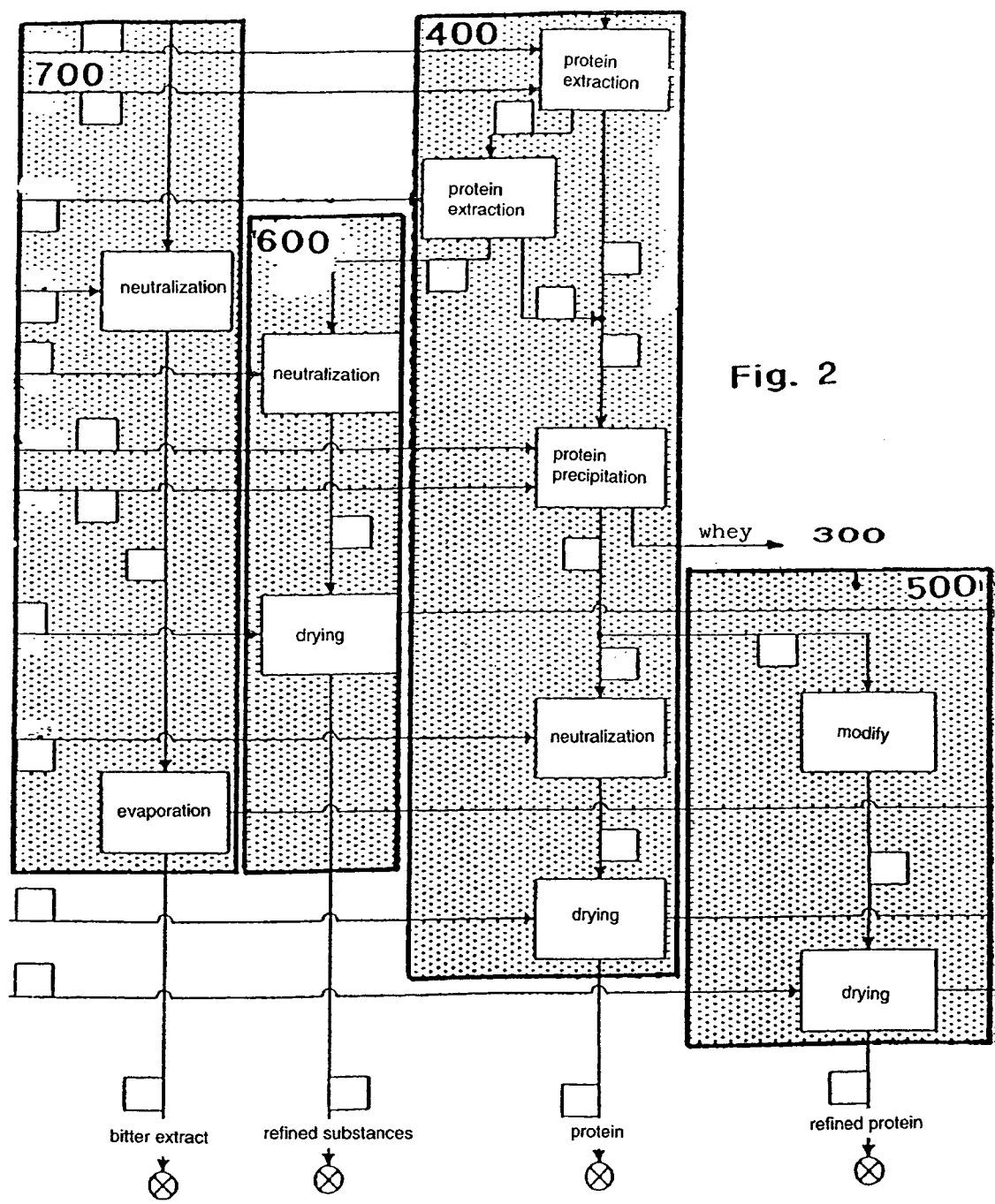

Initially, the de-oiled flakes are passed into an acid medium where all those substances—and particularly alkaloids—are dissolved which are soluble in an acid medium. The flakes processed in this manner are then passed to the protein extraction stage 400 according to FIG. 2, where the flakes are exposed, for instance repeatedly, to an alkaline medium, with fractioning taking place between the refined product and the protein extracts. In acid media the proteins can then be precipitated from the protein extract. The whey produced during the protein precipitation, whose pH level corresponds to that of the acid medium for disembitterment of the lupine seeds in the disembitterment stage 300, may be recycled in a closed circuit into the disembitterment process 300 again.

The residue presenting a reduced protein level is then passed on as substance flow for roughage processing for obtaining a refined product in the zone of the roughage processing stage 600 where the flakes are neutralized by the addition of an appropriate acid and are then dried. On the other hand, the protein extract produced in protein precipitation may result in the protein product directly when neutralization is appropriately carried out with the addition of alkaline media and subsequent drying. In an alternative, the functional properties of parts of the protein extract may be modified in the process step 500 by suitable thermal heat treatment or selective application of high-frequency fields, and in this manner, after drying, a refined protein product can be achieved.

It is not only possible to obtain the products of the raffinate, which corresponds to the roughage, as well as the protein products, but also to achieve bitter principle extracts selectively from the disembitterment process, which occur, for instance, as extract containing bitter principles in the bitter extract processing stage 700. To this end, bitter extracts are selectively removed from the disembitterment process 300, which, after appropriate processing steps such as isolation of fine substances, neutralization and evaporation to dryness, result in the final product.

It is equally possible to admix the shells separated in the process step 100 to the extract containing bitter principles. The extract to produced and fixed on shells may then be dried.

The essential aspect of the described inventive method of treating and processing alkaloid, oil and protein-containing lupine seeds consists in the aspect that the lipophilic alkaloids, which are very difficult to extract in the development process, have been extracted from the lupine seeds already in a preceding de-oiling process. In this manner one can largely completely preclude the existence of alkaloids in the products obtained by the end of the process. In accordance with the invention, the comminution of the lupine seeds to form flakes equally contributes to the possibility that firstly the bitter principles contained in the lupine seeds may completely escape from the seeds and secondly that the liquid and solid phases can be easily isolated in a technologically simple operation. Moreover, the behavior of the alkaloids in aqueous systems is substantially improved by removal of the lipophilic seed ingredients. This produces a positive influence particularly on the necessary dwelling times in the various extraction stages.

The invention claimed is:

1. A method of treating and processing alkaloid, oil and protein-containing lupine seeds for extraction of products from the lupine seeds by targeted fractionation, so that comminuted lupine seeds are de-oiled by introducing a solvent and a residue is depleted of substances soluble in an acid range, by adding acids, comprising comminuting and/or shaping the lupine seeds to form discoid flakes so that after pre-crushing of the shelled or non-shelled seeds, comminution of the seeds is carried out by a cooled flocculating roller, so as to maintain the seeds during comminution at a temperature below a temperature at which denaturation of the seeds occurs and heating the seeds by an indirect supply of heat substantially with exclusion of water, and performing after de-oiling depletion of the flakes of substances soluble in the acid range, by aqueous extraction, with a refined product of a reduced alkaloid level and an aqueous extract being obtained.

2. A method according to claim 1, wherein the seeds are screened by shape and size prior to comminution and/or shaping and are subsequently shelled.

3. A method according to claim 1, wherein the shelling is carried out with a technique wherein the lupine seeds are halved and separated from the shells.

4. A method according to claim 1, wherein the flocculating roller is cooled to a temperature lower than a denaturation temperature of the lupine proteins.

5. A method according to claim 1, wherein the discoid flakes have a platelet thickness of less than 1 mm.

6. A method according to claim 1, wherein the indirect heat supply is carried out by a heat pan.

7. A method according to claim 1, wherein the indirect heat supply deactivates seed-inherent enzymes, while proteins therein substantially retain native properties.

8. A method according to claim 1, wherein ethanol is used as a solvent to perform the de-oiling.

9. A method according to claim 1, wherein one of hexane, pentane, hexane, heptane or supercritical $CO_2$ is used as a solvent for de-oiling the discoid flakes.

10. A method according to claim 8, wherein de-oiling is combined with a mechanical oil separation process with the mechanical oil separation process using an ethanol water mixture in combination with centrifuging.

11. A method according to claim 1, wherein solvent is removed from the de-oiled discoid flakes.

12. A method according to claim 11, wherein removing the solvent is carried out under substantially water-free conditions.

13. A method according to claim 11, wherein removing the solvent is carried out with a superheated solvent.

14. A method according to claim 1, wherein indirect heating of the de-oiled flakes is carried out with a heat pan.

15. A method according to claim 1, wherein an oil percentage of the flakes which have been de-oiled and de-solvented, relative to the percentage of dry solids, is lower than 2%.

16. A method according to claim 11, wherein the flakes which have been de-oiled and de-solvented are passed on to a disembitterment process including:
    first supplying the flakes into an aqueous acid medium for isolation of substances soluble in the aqueous acid medium for obtaining an aqueous acid extract as a refined product insoluble in the acid range; and
    second supplying the refined product, which is insoluble in the acid range, into an aqueous alkaline medium for obtaining aqueous extracts and alkaline refined products insoluble in an acid range.

17. A method according to claim 1, wherein shells are added to flakes which have been de-oiled and de-solvented, which are passed on, together with the flakes, to a disembitterment process comprising:
    first supplying flakes with the shells into an aqueous acid medium for isolation of substances soluble in the acid medium to provide an aqueous acid extract and a refined product insoluble in the acid range, and second supplying the refined product, which is insoluble in the acid range, into an aqueous alkaline medium for obtaining aqueous extracts and alkaline refined products insoluble in an acid range.

18. A method according to claim 17, wherein prior to the addition of the shells to the flakes, the shells are ground.

19. A method according to claim 16, wherein the aqueous acid medium in the first supplying the flakes has a temperature lower than room temperature.

20. A method according to claim 16, wherein carrying out isolation of the aqueous acid extract from the refined product insoluble in the acid range is performed by centrifuging in a decanter, and the decanter is cooled and flushed in water or an extract in a zone of a solids accumulator.

21. A method according to claim 16, wherein in the second supplying uses a temperature for extraction in the aqueous alkaline medium higher than room temperature.

22. A method according to claim 16, wherein the first supplying the flakes is in a multi-stage aqueous acid process, and further comprises adjusting a ratio between the refined product insoluble in the acid range and the aqueous extract to less than 10:1 with one part of an aqueous extract from the aqueous extract being admixed.

23. A method according to claim 16, comprising adjusting a ratio between the refined product insoluble in the acid range and an aqueous extract of more than 10:1 with an outward transfer of one part of the aqueous extract being carried out within an immediately preceding process.

24. A method according to claim 14, comprising:
    using a separator to obtain from the aqueous acid extract an isolation of substances so that a product is obtained having a concentration of dry solids of at least 10%, a protein concentration in the dry solids higher than 70%, and an alkaloid level lower than 0.5%.

25. A method according to claim 24, wherein using isolation of the substances by means of a separator is carried out in a first process step using aqueous acid process steps, and the isolation of the substances is carried out after one of the first process steps or a preceding process step.

26. A method according to claim 16, wherein aqueous extraction includes a closed circuit performing a process comprising:
    suspending the de-oiled flakes in water at a pH level of substantially between 3.5 to 5.5 for separation of substances soluble in the acid range;
    performing protein extraction by mixing suspended flakes with lye at a pH level between 7.0 and 8.5;

separating the suspension of the de-oiled flakes by a decanter to obtain a refined product and the protein extract;

supplying an acid medium to the protein extract to achieve fractioning of whey and protein curds; and supplying the whey completely to pre-extracted flakes at a pH level of substantially between 3.5 to 5.5.

27. A method according to claim 26, wherein protein extraction is carried out in pH level stages for achieving protein fractioning.

28. A method according to claim 26, wherein the refined product has a protein concentration less than 20% in the dry solids, a roughage percentage higher than 60%, and a percentage of soluble carbohydrates lower than 5%.

29. A method according to claim 26, wherein:

carrying out isolation of the whey and the protein curds containing more than 85% of proteins in the dry solids by a decanter.

30. A method according to claim 29, wherein:

first purifying the extracted whey by means of a separator, then second purifying the whey of the first purification with a thermal treatment in a separator.

31. A method according to claim 30, wherein:

the twice purified whey is supplied into said process again, wherein the solids obtained in a first separation are subjected to further processing in a protein string with outward transfer of the solids obtained in another separation.

32. A method according to claim 26, wherein the refined product is fractioned by particle sizes into at least 2 fractions during or after a drying process.

33. A method according to claim 26, wherein:

drying pressed protein curds to have a protein dispersibility index (PDI) of 60 to 90% and a water-absorption capacity of less than 2 g/g at a pH level of about 7 and a temperature of 20 to 30° C.

34. A method according to claim 26, wherein:

confectioning protein curds by a hydro-thermal treatment to form a water binding product, by application of a temperature higher than 65° C., for drying the protein curds and with a water percentage at a beginning of drying of less than 85%, while a water absorption capacity of the water binding product is higher than 4.0 g/g.

35. A method according to claim 1, wherein:

mixtures of roughage and the protein isolates are produced, having protein level ranging between 20 and 70%, roughage concentration ranging between 30 and 80%, and a water absorption capacity being higher than 5 g/g.

36. A method according to claim 1, wherein shells, separated prior to the de-oiling, are mixed and dried with the aqueous extract at pH levels from 3.5 to 5.5.

37. A method of treating and processing alkaloid, oil and protein-containing seeds for extraction of products from the seeds by targeted fractionation, so that comminuted seeds are de-oiled by introducing a solvent and a residue is depleted of substances soluble in an acid range, by adding acids, comprising comminuting and/or shaping the seeds to form discoid flakes so that after pre-crushing of the shelled or non-shelled seeds, comminution of the seeds is carried out by a cooled flocculating roller, so as to maintain the seeds during comminution at a temperature below a temperature at which denaturation of the seeds occurs and heating the seeds by an indirect supply of heat substantially with exclusion of water, and performing after de-oiling depletion of the flakes of substances soluble in the acid range, by aqueous extraction, with a refined product of a reduced alkaloid level and an aqueous extract being obtained.

38. A method in accordance with claim 37, wherein the seeds are selected from the group consisting of rape, linseed, soybeans, peanuts, peas and horse peas.

39. A method according to claim 4, wherein the denaturation temperature is lower than 35° C.

40. A method according to claim 8, wherein thickness of the flakes ranges between 200 and 400 μm.

41. A method according to claim 13, wherein the superheated solvent is hexane.

42. A method according to claim 15, wherein the oil percentage is less than 1%.

43. A method according to claim 18, wherein a size of the comminuted seeds is less than 5 mm.

44. A method according to claim 21, wherein:

the temperature for extraction ranges between 35° C. and 45° C.

45. A process according to claim 24, wherein:

the concentration of dry solids is higher than 16%, the protein concentration in the dry solids is higher than 85% and the alkaloid level is less than 0.1% in the dry solids.

46. A process according to claim 28, wherein:

the roughage concentration is higher than 70% and the percentage of soluble carbohydrates is lower than 1%.

47. A method according to claim 29, wherein the whey and the protein curds contain more than 90% proteins in dry solids.

48. A method according to claim 32, wherein:

the refined product is refined by particle size into at least three fractions during or after a drying step.

49. A method according to claim 34, wherein:

the temperature is higher than 85° C., a water percentage at the beginning of drying is less than 75% and the water absorption capacity of the water binding product is higher than 5 g/g.

50. A method according to claim 35, wherein the water absorption capacity is higher than 7 g/g.

\* \* \* \* \*